July 14, 1931.  A. A. SILVA  1,814,973
CAMERA
Filed Sept. 4, 1926    5 Sheets-Sheet 1
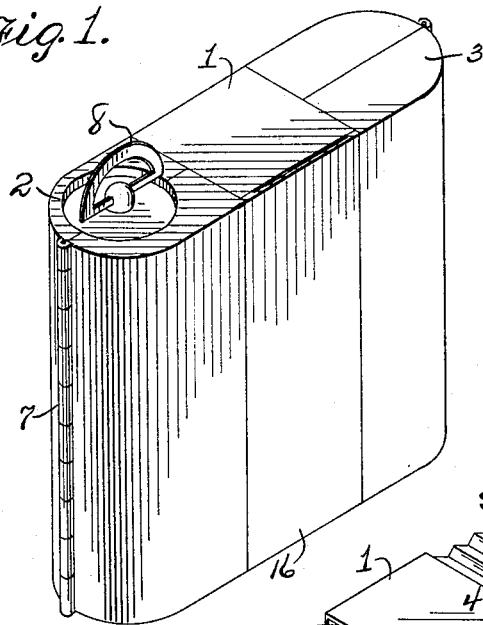
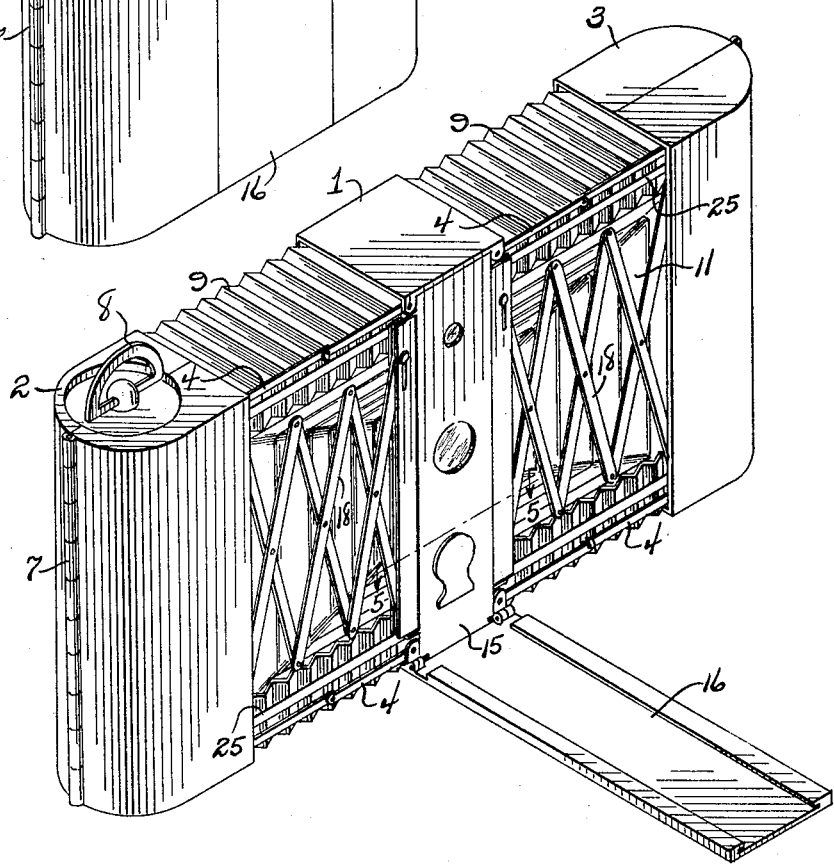
Aladin A. Silva
INVENTOR
BY Victor J. Evans
ATTORNEY
WITNESS John Donovan July 14, 1931.  A. A. SILVA  1,814,973
CAMERA
Filed Sept. 4, 1926   5 Sheets-Sheet 2

July 14, 1931.  A. A. SILVA  1,814,973
CAMERA
Filed Sept. 4, 1926   5 Sheets-Sheet 3
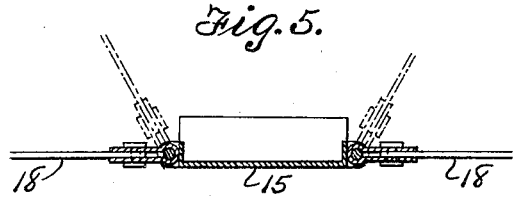
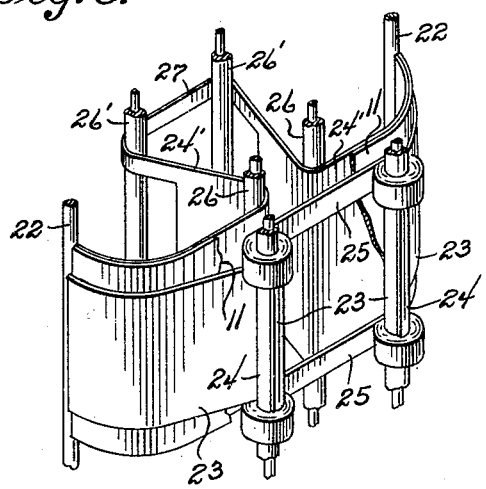
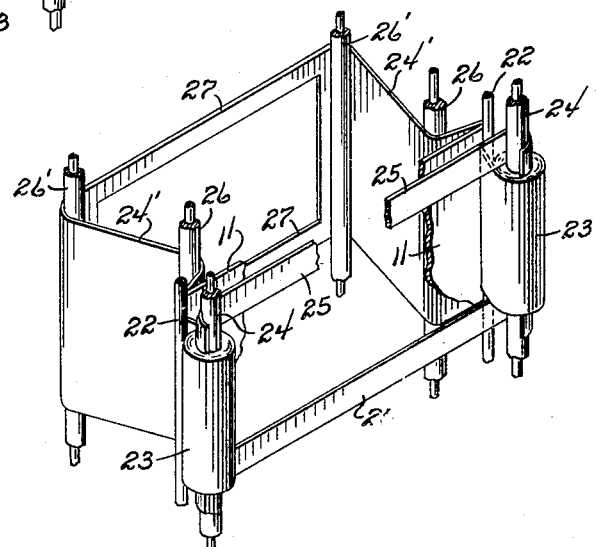
Aladin A. Silva
INVENTOR
BY Victor J. Evans
ATTORNEY
WITNESS:

July 14, 1931. A. A. SILVA 1,814,973
CAMERA
Filed Sept. 4, 1926  5 Sheets-Sheet 4

Aladin A. Silva
INVENTOR

BY Victor J. Evans
ATTORNEY

WITNESS: John Donovan

July 14, 1931. A. A. SILVA 1,814,973
CAMERA
Filed Sept. 4, 1926 5 Sheets-Sheet 5
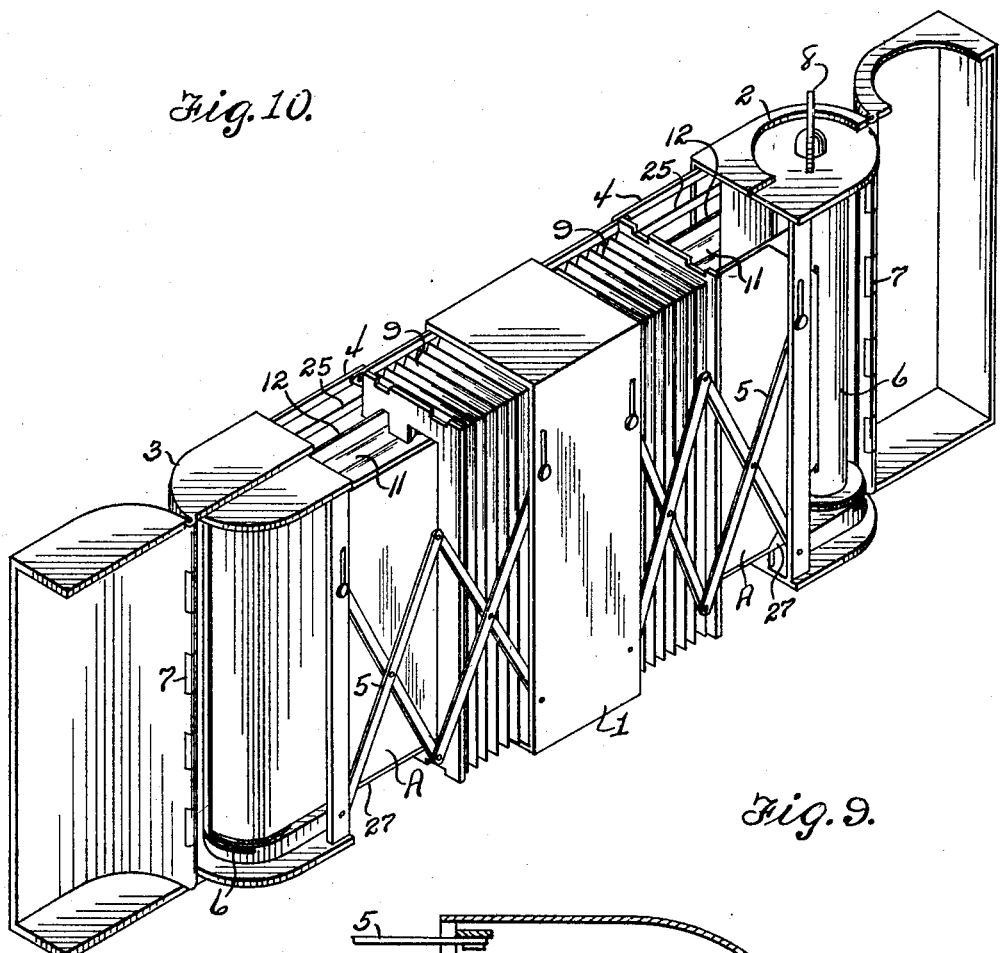
Fig. 10.
Fig. 9.
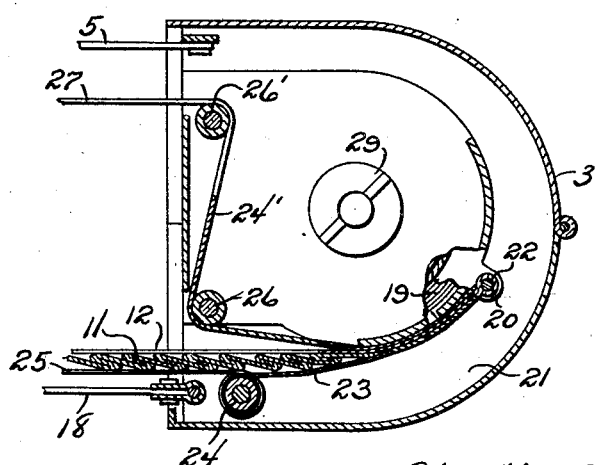
Aladin A. Silva
INVENTOR
BY Victor J. Evans
ATTORNEY
WITNESS: John Donovan Patented July 14, 1931

1,814,973

UNITED STATES PATENT OFFICE

ALADIN A. SILVA, OF MORATUWA, COLOMBO, CEYLON

CAMERA

Application filed September 4, 1926. Serial No. 133,589.

This invention relates to improvements in cameras, the general object of the invention being to provide means whereby the camera can be folded into a small compass when not in use so that it will occupy but little space and can be carried in the pocket of the user.

Another object of the invention is to form portions of the body of the camera of bellows-like construction for enabling the body to be folded.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a view of the camera, showing the same in folded condition.

Figure 2 is a view showing the camera in open position, but with the shutter carrying part pushed back.

Figure 5 is a section on line 5—5 of Figure 2.

Figure 6 is a diagrammatic view, showing the supports for the front bellows in folded position.

Figure 7 is a view showing these supports in open position.

Figure 9 is a view similar to Figure 8, but showing the parts in a different position.

Figure 10 is a perspective view, looking toward the rear of the camera, with the parts in open position.

Figure 11:
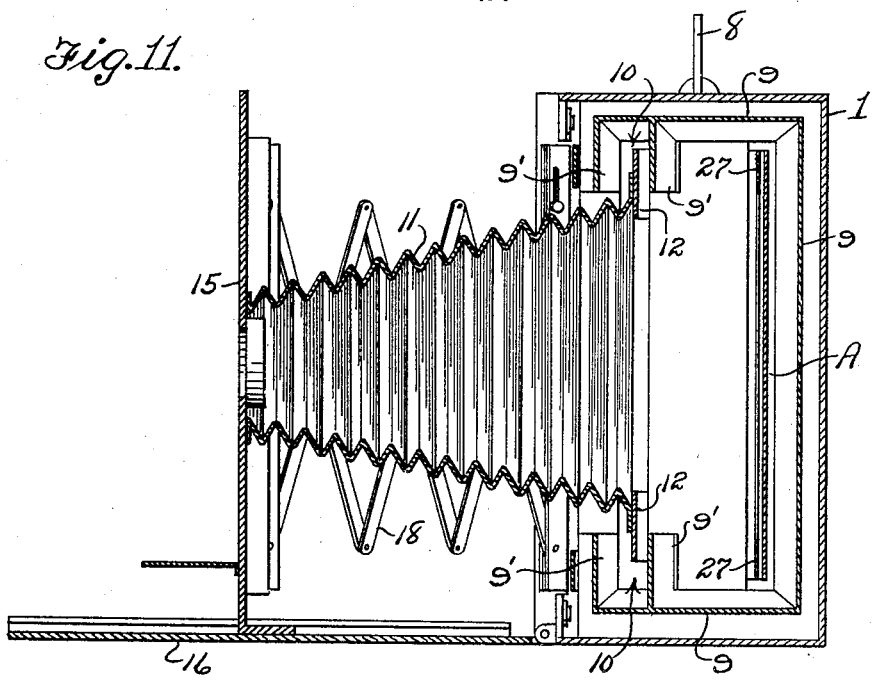
Figure 11 is a vertical sectional view through the camera, with the front bellows drawn out.

In these views, 1 indicates the central or shutter chamber and 2 and 3 indicate the end or film chambers. Upper and lower sets of levers 4 connect each film chamber with the central chamber at the front and a set of lazy tongs 5 connect each end chamber with the central chamber at the rear so that the end chambers can be moved against the central chamber by breaking the joints of the levers 4 and pushing the end chambers inwardly until they strike the central chamber, as shown in Figure 1. The end chambers are pulled outwardly until the levers 4 are in a straight position, as shown in Figure 2, the lazy tongs 5 moving in a straight line during this action so as to not interfere with the film which is shown at A in Figure 4. The spools 6 are placed in the chambers 2 and 3, these chambers being each formed in two halves hingedly connected together, as at 7, for permitting the spools to be put in the chambers and removed therefrom. The key for winding the film from the full spool to the empty spool is shown at 8. Each end chamber is connected with the central chamber at its rear and at its top and bottom by a bellows 9, and the front edge of the top and bottom portion of this bellows is formed with a groove 10 to receive the edges of the front bellows 11, the edges of this front bellows being reinforced by the steel tapes 12. This groove is formed by two depending parts 9' of the bellows 9 which are provided with the vertical creases, as shown in Figures 2 and 11. This arrangement makes a light-tight joint between the bellows. This front bellows is connected with the shutter carrying frame 15 which is adapted to be racked or otherwise pulled over the swinging member 16 which is hingedly connected at its lower end to the lower part of the central chamber 1. This frame 15 carries the shutter, the lens and the view finder 17, all of which may be of any desired construction.

A set of lazy tongs 18 is placed on each side of the bellows 11 and is fastened to the frame 15 and to the film chamber as shown. The lazy tongs are swiveled to the frame 15 so that they can readily move with said frame 15 as the same is pulled out or pushed in. Each film chamber has a pair of outer springs 19 in its lower end which tend to hold ears 20 in the rear part of an arc-shaped space 21 which partly surrounds the film space of the chamber. Each pair of ears carries a rod 22 which is connected to the outer end of each side of the bellows 11 so that as the film chambers are pushed inwardly against the chamber 1, the springs 19 will pull the bellows 11 partly into the spaces 21 so as to permit the camera to be folded, as in Figure 1, without interference from the bellows 11. As will be understood, when the bellows 11 is collapsed, the top and bottom portions thereof will fold themselves into strips which can readily bend and pass into the spaces 21. In order to facilitate this movement of the ends of the bellows 11 in the film chambers, I provide front strips 23 and rear strips 24' for receiving portions of the bellows between them, the ends of these strips being connected with the rods 22, with the opposite end of the strip 23 connected to a roller 24 carried by each end chamber, the two rollers being connected together by the tapes 25 in such a manner that as the end chambers are pulled apart, said tapes will rotate the rollers 24 in a direction to wind the strips 23 thereon, as shown in Figures 7 and 9, and when the end chambers are moved toward each other and the parts are pulled into the end chambers by the springs, the tapes 25 will be wound upon the rollers 24 as the strips 23 are being unwound therefrom.

Each end chamber carries a pair of guide rolls 26 and 26', the roll 26 being at the front and the roll 26' at the rear. Tapes 27 connect the two strips 24' together, and these tapes and strips are guided over the rolls 26 and 26' during the opening and closing movement of the end chambers, as shown in Figures 6 and 7. These tapes 27 also act to keep the film straight during the opening and closing movement. A spring 28 is arranged in one of the film chambers and is so connected with the spool in said chamber that it will take up the slack in the film when the camera is closed. The springs are wound by the key 29.

The strips 23 and 24' act as protectors for the bellows 11 when the same is being pulled into the film chambers and I prefer to make these strips of silk or the like. As will be seen, they receive portions of the bellows between them, with the strip 24' engaging the interior face of the bellows and the strip 23 engaging the exterior face thereof.

Figure 3:
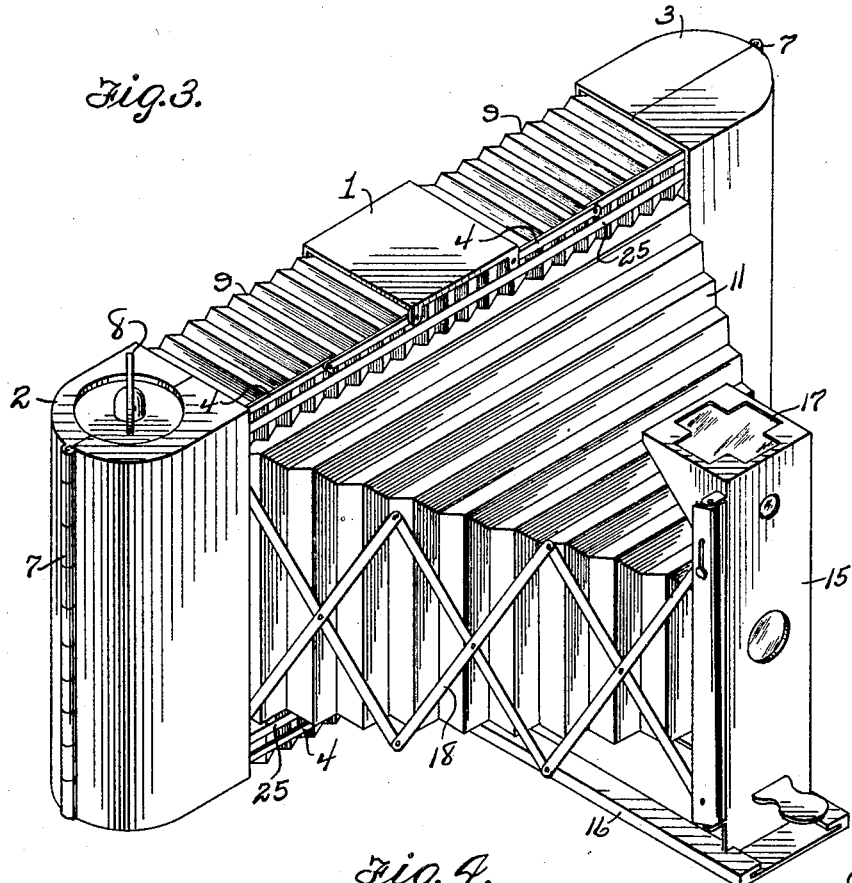
Figure 3 is a view of the camera fully open and with the shutter carrying part expanded.
Figure 4:
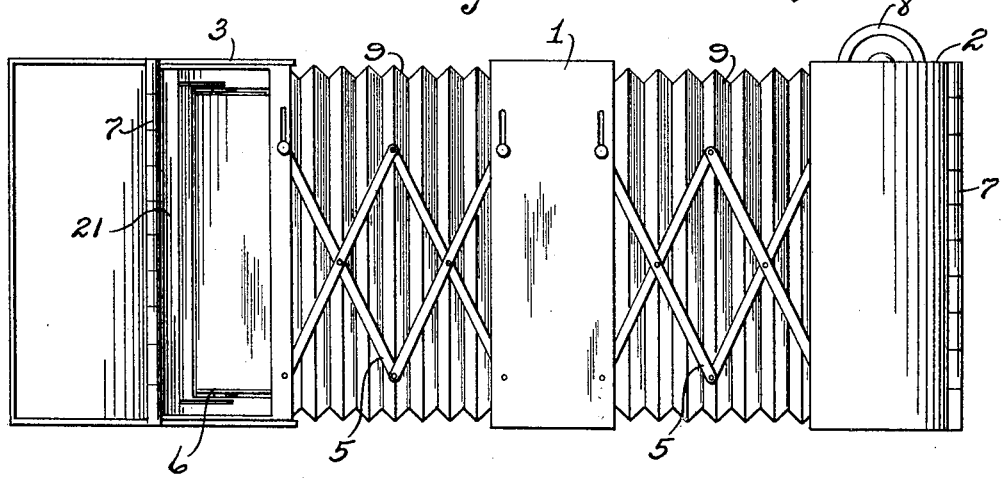
Figure 4 is a rear view of the camera, with the roll chambers in open position and with portions of the bellows back folded.
Figure 8:
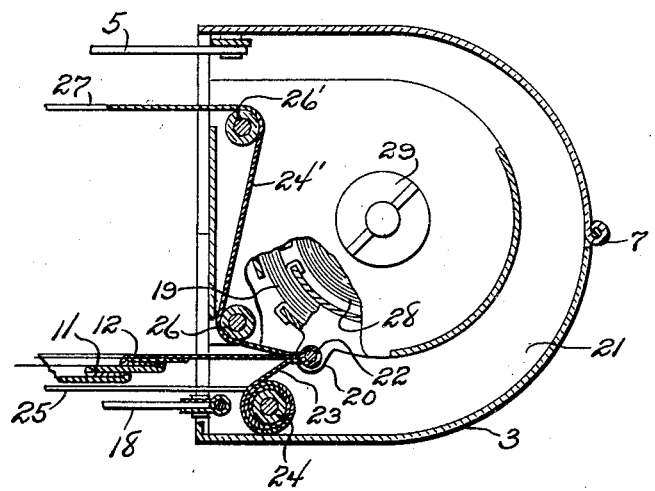
Figure 8 is a sectional view through one end of the camera.

From the foregoing, it will be seen that I have provided a camera which can be folded into a small compass so that it can be carried in the pocket or in a small holder, with means whereby portions of the bellows are moved into the end chambers by springs when the end chambers are pushed toward the central chamber. The levers 4, and the sets of lazy tongs 5 and 18 rigidly support the camera in open position, while enabling it to be folded. The rear portions of the bellows 9 can be made detachable from the end chambers so that the film can be carried across from the full spool to the empty spool, as shown in Figure 4.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A camera of the class described comprising a central chamber and a pair of end chambers, foldable means connecting the end chambers with the central chamber so that the end chambers can be pushed against the central chamber, bellows connecting the tops, bottom and rear portions of the end chambers with the central chamber, a bellows at the front of the camera, a lens frame connected therewith, a swinging member hinged to the bottom of the central chamber and forming a track for the shutter frame, means for holding spools in the end chambers and spring winding means in the end chambers for pulling portions of the front bellows into said chambers when the end chambers are moved against the central chamber.

2. A camera of the class described comprising a central shutter chamber and a pair of end chambers, lazy tongs connecting the rear of each end chamber with the central chamber, foldable levers arranged in sets at the top and bottom of the front part of the camera for connecting the end chambers with the central chamber, bellows connecting the top, bottom and rear parts of each end chamber with the central chamber, a bellows at the front of the camera, a shutter frame connected therewith, a track forming member for the shutter frame hingedly connected at its lower end to the central chamber, lazy tongs connecting the shutter frame with the end chambers and arranged at the sides of the front bellows and spring means in the end chambers for drawing portions of the front bellows thereinto when the end chambers are moved against the central chamber.

3. A camera of the class described comprising a central shutter chamber and a pair of end chambers, lazy tongs connecting the rear of each end chamber with the central chamber, foldable levers arranged in sets at the top and bottom of the front part of the camera for connecting the end chambers with the central chamber, bellows connecting the top, bottom and rear parts of each end chamber with the central chamber, a bellows at the front of the camera, a shutter frame connected therewith, a track forming member for the shutter frame hingedly connected at its lower end to the central chamber, lazy tongs connecting the shutter frame with the end chambers and arranged at the sides of the front bellows, spring means in the end chambers for drawing portions of the front bellows thereinto when the end chambers are moved against the central chamber, inner and outer protector strips for each end of the front bellows, means for causing these strips to enter the end chambers with the portions of the bellows, rollers at the front of the end chambers to which the front strips are connected, means for rotating these rollers to wind the front strips thereon when the end chambers are moved outwardly, tapes connecting the inner strips together and rollers carried by the end chambers and engaging the tapes and inner strips for causing the tapes to straighten out the film when the end chambers are moved outwardly.

4. A camera of the class described comprising a central shutter chamber and a pair of end chambers, lazy tongs connecting the rear of each end chamber with the central chamber, foldable levers arranged in sets at the top and bottom of the front part of the camera for connecting the end chambers with the central chamber, bellows connecting the top, bottom and rear parts of each end chamber with the central chamber, a bellows at the front of the camera, a shutter frame connected therewith, a track forming member for the shutter frame hingedly connected at its lower end to the central chamber, lazy tongs connecting the shutter frame with the end chambers and arranged at the sides of the front bellows, spring means in the end chambers for drawing portions of the front bellows thereinto when the end chambers are moved against the central chamber, inner and outer protector strips for each end of the front bellows, means for causing these strips to enter the end chambers with the portions of the bellows, rollers at the front of the end chambers to which the front strips are connected, means for rotating these rollers to wind the front strips thereon when the end chambers are moved outwardly, tapes connecting the inner strips together, rollers carried by the end chambers and engaging the tapes and inner strips for causing the tapes to straighten out the film when the end chambers are moved outwardly and spring means for taking the slack out of the film when the end chambers are moved against the central chamber.

In testimony whereof I affix my signature.

ALADIN A. SILVA.